(12) United States Patent
Mordukhovich

(10) Patent No.: US 7,040,475 B2
(45) Date of Patent: *May 9, 2006

(54) WET CLUTCH FRICTION MEMBER WITH DUAL-DIRECTIONAL MODULI OF ELASTICITY

(75) Inventor: Gregory Mordukhovich, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/833,918

(22) Filed: Apr. 28, 2004

(65) Prior Publication Data

US 2005/0077139 A1    Apr. 14, 2005

Related U.S. Application Data

(60) Provisional application No. 60/509,589, filed on Oct. 8, 2003.

(51) Int. Cl.
 *F16D 11/00* (2006.01)

(52) U.S. Cl. .............................. 192/107 C; 192/113.34

(58) Field of Classification Search ............ 192/107 R, 192/107 C, 107 M, 113.3, 113.31, 113.34, 192/113.36
See application file for complete search history.

(56) References Cited

U.S. PATENT DOCUMENTS

| | | | | |
|---|---|---|---|---|
| 3,037,860 A | * | 6/1962 | Masterson et al. ............. | 419/6 |
| 3,068,131 A | * | 12/1962 | Morton ...................... | 428/66.2 |
| 3,841,949 A | * | 10/1974 | Black ........................ | 428/66.2 |
| 4,529,079 A | * | 7/1985 | Albertson ................ | 192/107 C |
| 4,821,860 A | * | 4/1989 | Crawford et al. ........ | 192/107 C |
| 5,076,410 A | * | 12/1991 | Maycock et al. ........ | 192/107 R |
| 5,096,661 A | | 3/1992 | Lang .............................. | 419/2 |
| 5,137,133 A | * | 8/1992 | Graton et al. ........... | 192/107 C |
| 5,196,081 A | * | 3/1993 | Bicknell ................. | 156/244.11 |
| 5,199,540 A | * | 4/1993 | Fitzpatrick-Ellis et al. ...... | 192/70.11 |
| 5,305,864 A | * | 4/1994 | Strohm .................... | 192/107 C |
| 5,615,758 A | | 4/1997 | Nels ....................... | 192/113.36 |
| 5,662,993 A | | 9/1997 | Winckler .................... | 442/101 |
| 5,842,551 A | | 12/1998 | Nels ........................... | 192/107 |
| 6,132,877 A | | 10/2000 | Winckler et al. ........... | 428/408 |
| 2005/0077138 A1 | * | 4/2005 | Mordukhovich ....... | 192/107 M |
| 2005/0077140 A1 | * | 4/2005 | Mordukhovich ........ | 192/107 R |

* cited by examiner

*Primary Examiner*—Saul Rodriguez
(74) *Attorney, Agent, or Firm*—Christopher DeVries

(57) ABSTRACT

A friction member for engagement in a torque-transmitting mechanism includes a friction surface for sliding contact with an opposing reaction member in a torque-transmitting mechanism. The sliding contact is characterized by a coefficient of friction and acts to engage the friction member with the reaction member in the torque-transmitting mechanism. The friction member is characterized by a first modulus of elasticity in a first direction, preferably substantially normal to the sliding contact, and a second modulus of elasticity in a second direction, preferably substantially parallel to the sliding contact. The second modulus of elasticity is greater than the first modulus of elasticity and the moduli of elasticity cooperate to at least partially establish the coefficient of friction and control vibrational shudder. First and second channels may be formed in the first and second directions of the friction member, respectively, for transporting lubricant to at least partially increase the coefficient of friction and decrease vibrational shudder, respectively.

12 Claims, 1 Drawing Sheet

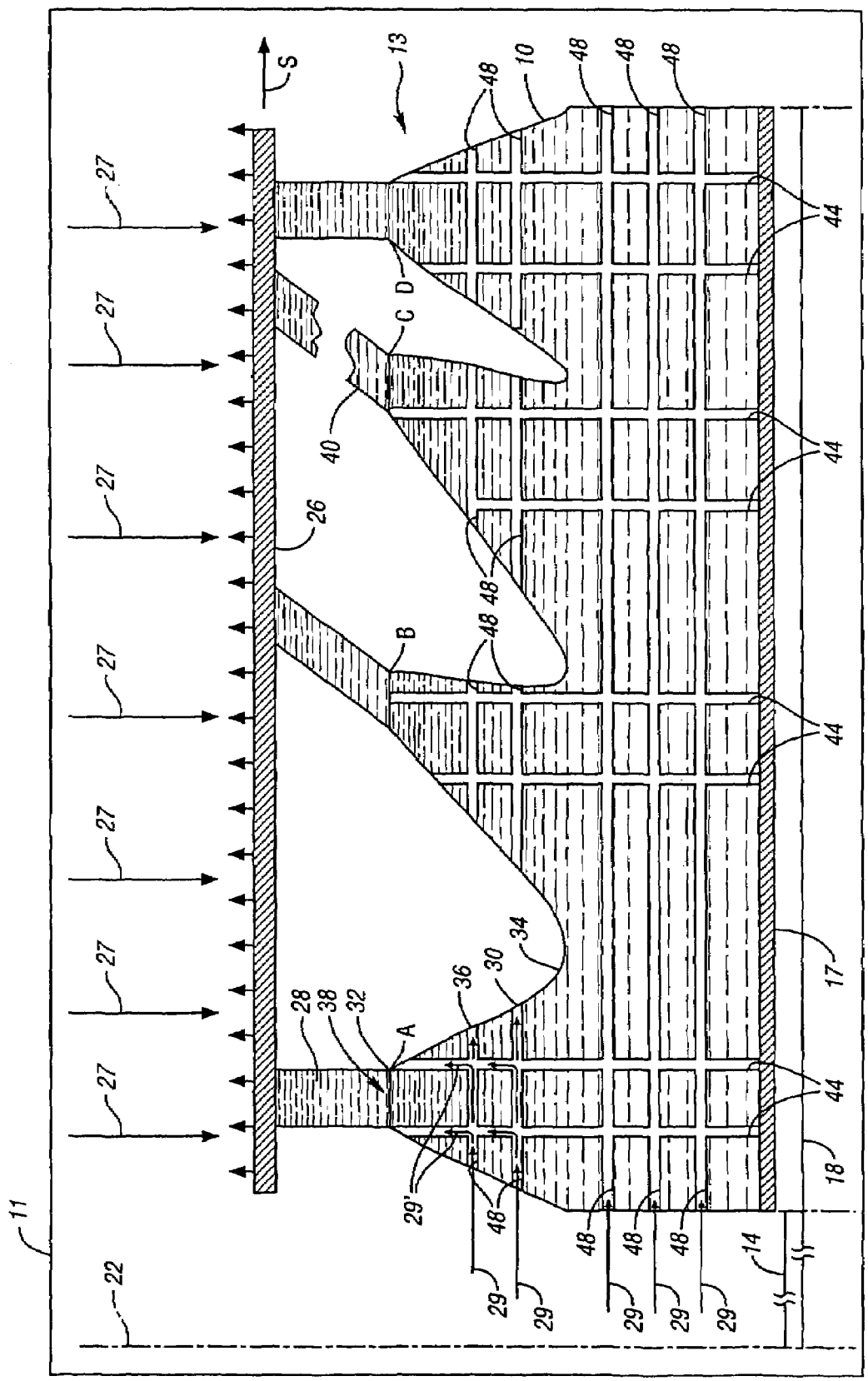

WET CLUTCH FRICTION MEMBER WITH DUAL-DIRECTIONAL MODULI OF ELASTICITY

CROSS-REFERENCE TO RELATED APPLICATIONS

This application claims the benefit of U.S. Provisional Application No. 60/509,589, filed Oct. 8, 2003, which is hereby incorporated by reference in its entirety.

TECHNICAL FIELD

This invention relates to a friction clutch member for use in a wet clutch application.

BACKGROUND OF THE INVENTION

A vehicle engine is traditionally coupled with a transmission for transmitting torque to the wheels via a torque converter. A wet friction interface may be used with the torque converter for establishing torque transfer under a slip condition (i.e., relative rotation of opposing surfaces forming the friction interface). U.S. Pat. No. 6,132,877, issued Oct. 17, 2000 to Winckler et al, assigned to General Motors Corporation, and hereby incorporated by reference in its entirety, describes a friction interface composed of a high density, low porosity, carbon composite material, infiltrated with chemical vapor deposited carbon and, preferably, having a substrate of a satin weave fabric. Another application of a friction interface used in a torque converter is described in U.S. Pat. No. 5,195,621, issued Mar. 23, 1993 to Dull et al, assigned to General Motors Corporation, and hereby incorporated by reference in its entirety. The use of friction material having a heat resistant paper support bearing resin-bonded carbon particles is known in the art, as described in U.S. Pat. No. 5,083,650, issued Jan. 28, 1992 to Seiz et al, assigned to Minnesota Mining and Manufacturing Company and to General Motors Corporation, which is hereby incorporated by reference in its entirety.

Additionally, a wet clutch with a friction interface maybe used in lieu of a torque converter for vehicle launch with slip, especially on vehicles designed with a wider overall speed ratio, as the ratio-boosting affect of the torque converter may not be necessary in such an application.

SUMMARY OF THE INVENTION

A friction member that provides a high coefficient of friction at high slip speeds while minimizing vibrational shudder during vehicle launch is desired. Additionally, control of operational viscosity and shearability of the transmission fluid is desirable, as the coefficient of friction is affected by these properties.

A friction member with dual-directional moduli of elasticity for engagement in a torque-transmitting mechanism (i.e., a clutch) includes a friction surface for sliding contact with an opposing reaction member in the clutch. The clutch may be a friction interface within a torque converter or a friction interface within a rotating or stationary clutch. As used herein, and as will be readily understood by those of ordinary skill in the art, "sliding contact" means that there is relative sliding movement (i.e., slip) between the friction member and the reaction member; preferably, during "sliding contact", the friction surface and reaction member are generally separated from direct physical contact with one another by a layer of lubricant disposed therebetween. The sliding contact is characterized by a coefficient of friction and acts to engage the friction member with the reaction member. The friction member is characterized by a first modulus of elasticity in a first direction with respect to the sliding contact and a second modulus of elasticity in a second direction with respect to the sliding contact. Preferably, the first direction is substantially normal to the sliding contact and the second direction is substantially parallel to the sliding contact. The second modulus of elasticity is greater than the first modulus of elasticity. The first and second moduli of elasticity cooperate to at least partially establish the coefficient of friction (i.e., maximize) and control vibrational shudder (i.e., minimize) resulting from the sliding contact.

The friction member may be formed with channels disposed in the first direction (i.e., first channels) for transporting lubricant through the friction member in the first direction. The first modulus of elasticity is at least partially affected by lubricant transport through the first channels. Transporting lubricant through the first channels acts to increase the coefficient of friction. The friction member may also be formed with channels disposed in the second direction (i.e., second channels) for transporting the lubricant through the friction member in the second direction. The second modulus of elasticity is at least partially affected by lubricant transport through the second channels. Transporting lubricant through the second channels at least partially decreases the vibrational shudder.

The friction member is characterized by an inner diameter and an outer diameter. The first and second channels are operable for transporting lubricant from one of the inner diameter and the outer diameter. Accordingly, the lubricant may be supplied to the first and second channels from either the inner diameter or the outer diameter. When lubricant is supplied from the outer diameter, greater pressure is required to overcome centrifugal force to transport the lubricant through the second channels. Accordingly, greater fluid pressure will be experienced in the second channels in this instance, creating a greater second modulus of elasticity. The friction member may include carbon-based fibers.

A power transmission includes a torque-transmitting mechanism. The torque-transmitting mechanism includes a friction member and an opposing reaction member. The friction member and reaction member are selectively engageable for transmitting power. The friction member has a friction surface for providing contact with the reaction member. The sliding contact is characterized by a coefficient of friction and acts to engage the friction member with the reaction member in the torque-transmitting mechanism. The friction member is characterized by a first and a second modulus of elasticity as described above. Additionally, the friction member may be formed with first and second channels as described above. The first and second channels transport lubricant through the friction member as described above. Lubricant may be supplied from an inner diameter or an outer diameter of the friction member as described above.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

The drawing FIGURE is a schematic cross-sectional view of a friction member in sliding contact with a reaction member, in accordance with the invention.

DESCRIPTION OF THE PREFERRED EMBODIMENT

Referring to the drawing FIGURE, a schematic radial cross section of a friction member 10 for a transmission 11 is depicted. Preferably, the friction member 10 is an annular ring with an inner radius 14 and an outer radius 18 measured from a center axis of rotation 22. (A corresponding inner diameter and outer diameter are associated with the inner radius 14 and outer radius 18, respectively.) The material from which the friction member is formed has a modulus of elasticity E. The friction member 10 is connected to a clutch plate 17 using adhesives or other attachment mechanisms. The friction member 10 opposes a reaction member or reaction plate 26. The friction member 10 and reaction plate 26 are included in torque-transmitting mechanism 13, which may be a clutch within a torque converter included in the transmission 11. Alternatively, the torque-transmitting mechanism 13 may be a friction interface of a rotating clutch or stationary clutch (i.e., a brake). The reaction plate 26 may be in the shape of an annular ring with an inner and outer radius similar to those of the friction member 10. Transmission fluid, also referred to as lubricant or oil, is disposed in the transmission. Some of the fluid forms a column of oil 28 disposed between the reaction plate 26 and the friction member 10, as depicted in FIG. 1, such that engagement of the friction member 10 and the reaction plate 26 is a "wet clutch" application.

At a microscopic level, the friction member 10 is porous with an uneven, irregular surface 30. Elevational differences between a selected peak (high portion) 32 and valley (low portion) 34 form a peaked portion 36. (The friction member 10 has a multitude of peaked portions of various heights, only one of which is schematically depicted in the drawing FIGURE at various stages of flex during sliding of the reaction plate 26 relative to the friction member 10.) When applied pressure (denoted by arrows 27) forces the reaction plate 26 and the friction member 10 toward one another, the actual contact area 38 (i.e., the area of the friction surface 30 over which sliding contact occurs) between the plate 26 and the friction member 10 is in the vicinity of the peak 32.

During the elasto-hydrodynamic (EHD) phase of clutch engagement, the column of oil 28 is disposed between the plate 26 and the friction member 10. During engagement, it may be desirable to have a period of slip (i.e., a velocity differential, also referred to as slip speed) between the friction member 10 and the reaction plate 26 to allow for a gradual torque transmission. The coefficient of friction u (i.e., the ratio of resulting tangential force between the friction member 10 and the reaction plate 26 to the applied normal force) may vary with slip speed, as it may be more difficult for the friction member 10 to "grab" to the reaction plate 26 at high slip speeds. It is desirable to maximize the coefficient of friction u at high slip speeds for efficient torque transfer. Generally, a friction member having a low modulus of elasticity in the direction normal to the actual contact area 38 (herein referred to as a first modulus of elasticity $E_1$) will increase the actual contact area 38, thus providing a greater coefficient of friction u than a friction member with a high modulus of elasticity in the normal direction.

The coefficient of friction u is also a function of the oil viscosity and shearability at the actual contact area 38. During frictional engagement, the viscous property of the column of oil 28 in contact with the peaked portion 36 causes the peaked portion 36 to bend or flex in the direction of slide (i.e., slip) between the friction member 10 and the plate 26. The bend or flex of the peaked portion 36 is proportional to its stiffness in the direction of slide (i.e., its modulus of elasticity in the radial direction, also referred to herein as the second modulus of elasticity, $E_2$). The direction of slip or slide is denoted in the drawing FIGURE by the arrow labeled S. As is schematically depicted in the drawing FIGURE, during slide (i.e., slip), a given peaked portion 36 will bend from an original position A to an intermediate bent position B. At a later time, shear forces will cause the column of oil 28 at the contact area 38 to shear (depicted by sheared oil contact 40); at the shear point, the peaked portion 36, momentarily no longer subject to the viscous force of the column of oil 28, will spring back from a final bent position C to the position D, which is substantially the same as original position A. This spring-back of peaked portions during shear may contribute to vibrational shudder of the transmission. Accordingly, it is desirable to minimize the deformability of the friction member 10 in the direction of slide (which is parallel with the contact area 38), thus minimizing vibrational shudder. This may be accomplished by providing a relatively high second modulus of elasticity $E_2$ in the direction of slide. The fluid pressure in the friction member 10 may also influence shudder; for instance, a highly pressurized fluid acting on the friction member 10 may increase the modulus of elasticity $E_2$.

Vibrational shudder may be minimized by increasing the modulus of elasticity $E_2$ and/or decreasing the modulus of elasticity $E_1$. Shudder caused by "self excitation" of the friction member 10 may occur if the reaction plate 26 is not flat. During use, a reaction plate that is not flat may have different localized temperatures across it (due to an irregular contact area) causing variations in the height of a typical column of oil 28 between the reaction plate 26 and the friction member 10, thus creating variations in cooling. As discussed below, temperature variations may lead to shudder. Decreasing the modulus of elasticity $E_1$ increases the damping capability of the friction member 10, allowing it to conform to the surface area of the reaction plate 26 (which is typically not perfectly flat), thus minimizing temperature variations.

Vibrational shudder may also occur if the reaction plate 26 and friction member 10 are not parallel upon engagement. Such misalignment will cause a portion of the friction member 10 to contact the reaction plate 26 prior to the remainder of the friction member 10, resulting in pressure variations across the friction member 10. As discussed below, pressure variations cause temperature and oil viscosity variations, which may lead to shudder.

The coefficient of friction, the operational oil viscosity and the shearability of the oil at the contact area are functions of pressure and temperature at the contact area, as well as the pressure differential between the high portion 32 (i.e., the portion of the friction member 10 in sliding contact with the reaction plate 26) and the low portion 34 (i.e., the portion of the friction member 10 out of sliding contact with the reaction plate 26). Temperature is lower at higher pressures. In fact, the actual contact temperature may be up to 300° C., at which temperature the operational viscosity is very sensitive to pressure fluctuations. Accordingly, it follows that operational oil viscosity (which increases with increased pressure) must be kept high at high temperatures in order to minimize or avoid asperity contact. It should be noted that higher slip speeds lead to increased system temperatures. Additionally, the temperature at the contact area may be controlled (i.e., minimized) by one or more of (i) keeping the applied piston pressure low; (ii) increasing the actual contact area; and (iii) controlling the flow of oil past the contact area (permitting cooling thereof) by increasing the clutch oil pressure. With respect to the second alternative above, the actual contact area 38 may be increased by modifying the surface design of the friction member 10. Minimizing temperature at the contact area also leads to a longer useful life of the lubricant, as the rate of depletion of friction modifier additives that may be in the lubricant is decreased at lower temperatures. Additionally, the pressure and temperature at the contact area and the pressure differential are affected by and, therefore, can be controlled by controlling the modulus of elasticity in the normal direction (i.e., the first modulus of elasticity, $E_1$) and the fluid pressure in the porous friction member 10.

The fluid pressure in the friction member 10 is a function of the radial porosity of the member 10, the pressure applied to the fluid from a pressure source such as a pump (not shown) as well as centrifugal forces acting to move fluid radially outward. With increasing clutch pressure, the coefficient of friction is increased at a given slip speed. Additionally, with fluid flow, the fluctuation or spike in the coefficient of friction u (felt as vibrational shudder) as the sliding speed approaches 0.00 m/s (i.e., near completion of clutching, after the slip launch phase) is lessened with respect to that which occurs when there is no fluid flow. The friction coefficient u typically experiences such a spike, causing shudder, near clutch completion. The coefficient of friction often decreases at higher slip speeds.

The friction member 10 is formed with first channels 44 disposed axially, in a first direction substantially normal to the sliding contact between the friction member 10 and the reaction plate 26. The first channels 44 are able to transport fluid to and from the contact area 38. Thus, the first channels 44 affect the temperature and pressure at the contact area as well as the pressure differential between the high portion 32 and low portion 34. The first channels 44 also affect the modulus of elasticity $E_1$ in the first direction. Preferably, the modulus of elasticity $E_1$ is significantly less than the modulus of elasticity E of the friction member 10 formed without the channels 44. Accordingly, the design of the first channels 44 may at least partially affect (e.g., increase) the friction coefficient u of the friction member 10 during engagement.

The friction member 10 is formed with second channels 48 disposed radially, in a second direction substantially parallel to the sliding contact area 38 between the friction member 10 and the reaction plate 26. The second channels 48 increase the porosity of the frictional member 10 in the sliding direction. Preferably, the second channels 48 remain at least partially open, permitting oil flow therethrough, even under loading by normal forces between the friction member 10 and the reaction plate 26. The channels 44 and 48 of the drawing FIGURE are shown schematically as straight, parallel and perpendicular lines for illustrative purposes; however, the channels 44, 48 are likely to be irregular in practice, having sufficient porosity to allow flow in the parallel and perpendicular directions.

Movement of fluid through the member 10 helps to cool the contact area 38 and control the pressure and pressure differentials near the contact area 38 (thereby increasing the coefficient of friction). While radial and normal porosity may contribute to such movement, they may also pressurize and thereby stiffen the friction member 10, increasing the modulus of elasticity in both the first direction (i.e., $E_1$, which may not be desirable, because it thereby decreases the coefficient of friction u, as discussed above) and the second direction (i.e., $E_2$, which is desirable, because it thereby decreases vibrational shudder, as discussed above). Additionally, centrifugal forces act upon the fluid, moving it radially outward. Thus, an oil supply to the second channels 48 from the inner radius 14 of the friction member 10 (as shown by arrows 29 denoting fluid transport into the channels 48) will work with the centrifugal force whereas an oil supply from the outer radius 18 of the friction member 10 will work against centrifugal force, requiring a greater oil clutch pressure to move the fluid radially inward through the friction member 10. (Arrows 29' denote fluid transport from the channels 48 to the channels 44. Fluid transport is only shown in selected channels 44, 48, or portions thereof. Like fluid transport occurs throughout the channels 44, 48.)

Accordingly, an oil supply from the outer radius 18 to the channels 48 requires a greater fluid pressure than an oil supply from the inner radius 14 to the channels 48. A relatively greater fluid pressure leads to better shudder resistance (i.e., greater $E_2$ as described above) while a relatively lower fluid pressure leads to greater damping properties in the normal direction (i.e., lower E1). The size and number of channels 44, 48 also affects the required fluid pressure to affect fluid flow through the channels, as will be readily understood to those skilled in the art. Thus, the selected size and number of the channels 44, 48, as well as the choice of supplying fluid from the inner versus the outer radius 14, 18, respectively, allows for an optimized, dual-directional moduli of elasticity in the friction member 10.

It is desirable to establish a relatively high modulus of elasticity $E_2$ in the second direction (i.e., the radial direction) to minimize shudder, as discussed above. (Preferably, the modulus of elasticity $E_2$ is greater than the modulus of elasticity E of the friction member 10 formed without the channels 48.) However, it is desirable to keep the stiffness, or modulus of elasticity $E_1$ in the normal direction low, as discussed above, to maximize the coefficient of friction u. Accordingly, the first and second channels 44, 48 must be designed in appropriate size and number to accomplish the goals of low $E_1$, high $E_2$ (i.e., dual-directional moduli of elasticity) and adequate porosity to provide cooling circulation of the oil at the actual contact area 38. Preferably, the channels 44 and 48, although likely deformed, remain open even under clutch pressure, such that the cooling function is accomplished.

While the best mode for carrying out the invention has been described in detail, those familiar with the art to which this invention relates will recognize various alternative designs and embodiments for practicing the invention within the scope of the appended claims.

The invention claimed is:

1. A friction member for engagement in a torque-transmitting mechanism, said friction member comprising:

a friction surface having a contact area for sliding contact with an opposing reaction member in the torque-transmitting mechanism, wherein said sliding contact is characterized by a coefficient of friction, said sliding contact acting to engage the friction member with said reaction member in the torque-transmitting mechanism;

wherein the friction member is characterized by a first modulus of elasticity in a first direction with respect to said sliding contact;

wherein the friction member is further characterized by a second modulus of elasticity in a second direction with respect to said sliding contact, wherein said second modulus of elasticity is greater than said first modulus of elasticity;

wherein the friction member is formed with channels disposed in said first direction for transporting lubricant through the friction member to said contact area, said first modulus of elasticity being at least partially affected by lubricant transport through said channels to thereby at least partially increase said coefficient of friction; and wherein said first and second moduli of elasticity cooperate to at least partially establish said coefficient of friction and control vibrational shudder of the torque-transmitting mechanism resulting from said sliding contact.

2. The friction member of claim 1, wherein said first direction is substantially normal to said sliding contact; and wherein said second direction is substantially parallel to said sliding contact.

3. The friction member of claim 1, wherein the friction member is characterized by an inner diameter and an outer diameter; and wherein said channels are operable for transporting lubricant from one of said inner diameter and said outer diameter.

4. The friction member of claim 1, wherein the friction member is formed with channels disposed in said second direction for transporting lubricant through said friction member in said second direction, said second modulus of elasticity being at least partially affected by lubricant transport through said channels to thereby at least partially decrease vibrational shudder of the torque-transmitting mechanism.

5. The friction member of claim 4, wherein the friction member is characterized by an inner diameter and an outer diameter; and wherein said channels are operable for transporting lubricant from one of said inner diameter and said outer diameter.

6. The friction member of claim 1, wherein said friction member includes carbon-based fibers.

7. A power transmission comprising:

a torque-transmitting mechanism including:

a friction member;

an opposing reaction member, said friction member and reaction member being selectively engageable for transmitting power;

said friction member having a friction surface with a contact area for sliding contact with the reaction member, wherein said sliding contact is characterized by a coefficient of friction, said sliding contact acting to engage said friction member with said reaction member in said torque-transmitting mechanism;

wherein said friction member is characterized by a first modulus of elasticity in a first direction with respect to said sliding contact;

wherein said friction member is further characterized by a second modulus of elasticity in a second direction with respect to said sliding contact;

wherein said second modulus of elasticity is greater than said first modulus of elasticity;

wherein said friction member is formed with channels disposed in said first direction for transporting lubricant through said friction member to said contact area, said first modulus of elasticity being at least partially affected by lubricant transport through said channels to thereby at least partially increase said coefficient of friction; and wherein said first and second moduli of elasticity cooperate to at least partially establish said coefficient of friction and control vibrational shudder of said torque-transmitting mechanism resulting from said sliding contact.

8. The transmission of claim 7, wherein said first direction is substantially normal to said sliding contact; and wherein said second direction is substantially parallel to said sliding contact.

9. The transmission of claim 7, wherein said friction member is characterized by an inner diameter and an outer diameter; and wherein lubricant is supplied to said channels from one of said inner diameter and said outer diameter.

10. The transmission of claim 7, wherein said friction member is formed with channels disposed in said second direction for transporting lubricant through said friction member in said second direction, said second modulus of elasticity being at least partially affected by lubricant transport through said channels to thereby at least partially decrease vibrational shudder of said torque-transmitting mechanism.

11. The transmission of claim 10, wherein said friction member is characterized by an inner diameter and an outer diameter; and wherein lubricant is supplied to said channels from one of said inner diameter and said outer diameter.

12. A friction member for engagement in a torque-transmitting mechanism, the friction member comprising:

a friction surface having a contact area for sliding contact with an opposing reaction member in the torque-transmitting mechanism, wherein said sliding contact is characterized by a coefficient of friction, said sliding contact acting to engage the friction member with the reaction member in the torque-transmitting mechanism;

wherein the friction member is characterized by a first modulus of elasticity in a first direction substantially normal to said sliding contact, wherein the friction member is further characterized by a second modulus of elasticity in a second direction substantially parallel to said sliding contact, wherein said second modulus of elasticity is greater than said first modulus of elasticity, wherein said first and second moduli of elasticity cooperate to at least partially establish said coefficient of friction and control vibrational shudder of the torque-transmitting mechanism resulting from said sliding contact;

wherein the friction member is formed with first channels disposed in said first direction for transporting lubricant through the friction member to said contact area, wherein the friction member is further formed with second channels disposed in said second direction for transporting said lubricant through the friction member in said second direction, said first and second moduli of elasticity being at least partially affected by lubricant transport through said first and second channels in said first and second directions, respectively, said transporting of lubricant through said first and second channels thereby at least partially increasing said coefficient of friction and decreasing vibrational shudder of the torque-transmitting mechanism, respectively;

wherein the friction member is characterized by an inner diameter and an outer diameter; and wherein said first and second channels are operable for transporting lubricant from one of said inner diameter and said outer diameter.

* * * * *